United States Patent
Rooney

(10) Patent No.: US 6,364,760 B1
(45) Date of Patent: Apr. 2, 2002

(54) AIR OUTLET SYSTEM

(76) Inventor: David A. Rooney, 2823 Golfview Dr., Troy, MI (US) 48084

(*) Notice: Subject to any disclaimer, the term of this patent is extended or adjusted under 35 U.S.C. 154(b) by 0 days.

(21) Appl. No.: 09/578,074

(22) Filed: May 23, 2000

(51) Int. Cl.⁷ ............................................. B60H 1/34
(52) U.S. Cl. ....................................................... 454/154
(58) Field of Search ................................. 454/154, 286

(56) References Cited

U.S. PATENT DOCUMENTS

| | | | |
|---|---|---|---|
| 2,755,729 A | * 7/1956 | Galbraith et al. | 454/154 |
| 3,276,347 A | * 10/1966 | Atkinson et al. | 454/154 |
| 4,006,673 A | 2/1977 | Meyer et al. | |
| 4,092,907 A | 6/1978 | Meyer et al. | |
| 4,610,196 A | 9/1986 | Kern | |
| 5,397,267 A | 3/1995 | Vecellio et al. | |
| 5,733,189 A | 3/1998 | Eastwood | |
| 5,746,651 A | 5/1998 | Arajs et al. | |
| 5,921,860 A | 7/1999 | Marsden | |

FOREIGN PATENT DOCUMENTS

| | | | | |
|---|---|---|---|---|
| CA | 629587 A | * | 10/1961 | 454/286 |
| DE | 25 19 846 A | * | 11/1976 | 454/154 |
| DE | 27 54 869 A | * | 6/1978 | 454/286 |
| FR | 1.016.377 A | * | 11/1952 | 454/286 |
| GB | 576859 A | * | 4/1946 | 454/286 |

* cited by examiner

*Primary Examiner*—Harold Joyce
(74) *Attorney, Agent, or Firm*—Reising, Ethington, Barnes, Kisselle, Learman & McCulloch, P.C.

(57) ABSTRACT

An air outlet system of a sphere and socket type. The air outlet system includes a housing, a hollow sphere rotatably mounted therein, and a bearing therebetween; and pluralities of openings in respective predetermined shapes formed in oppositely disposed portions of the hollow sphere for dispersing air supplied thereto from a remote source in respective diffused or straight paths, depending upon the rotational position of the hollow sphere in the housing. An intermediate position of the sphere between the oppositely disposed openings serves to block the flow of air.

4 Claims, 3 Drawing Sheets

AIR OUTLET SYSTEM

TECHNICAL FIELD

This invention relates generally to air outlet systems and, more particularly, to a "sphere and socket" type air outlet system which is adaptable to being rotated so as to selectively direct air in a straight path or a diffused path, or to substantially block off air flow therethrough.

BACKGROUND ART

Heretofore, automotive air outlet systems have generally included barrel-type housings having many moving parts, including movable directional vanes mounted therein for directing air in straight paths. While most such units incorporate four-sided mountings, circular mountings are known.

Specifically, Arajs et al U.S. Pat. No. 5,746,651 discloses a circular housing having an "eyeball"-type barrel movable therein. The barrel includes three fixed arcuate shaped spaced apart directional vanes, creating an outer substantially spherical effect, the center one of which serves as a knob or handle for pivotably redirecting the barrel within the housing along either a lateral or a longitudinal axis. There is no diffusion feature included.

Kern U.S. Pat. No. 4,610,196 discloses a rectangular air outlet opening having a remotely controlled swivel damper including curved deflectors pivotable within an inner arcuate shaped housing portion to fully block air flow, divert it in particular directions, or allow the air to pass unobstructed.

Other known air outlet nozzles or vents having circular outlet mounts include U.S. Pat. Nos. 4,006,673; 4,092,907; 5,733,189; and 5,921,860.

U.S. Pat. Nos. 4,006,673 and 4,092,907 include spherical internal components with central bevel gear drives. U.S. Pat. No. 5,733,189 includes a tubular body having a spherical-shaped air grill therein formed by spaced-apart parallel vanes. U.S. Pat. No. 5,921,860 disclosed a housing composed of a rear converging frustrum of a cone integral with forward extending diverging frustrum of a cone with a perforated outlet grille. A central frustoconical deflection controller is connected to a control shaft mounted about a ball so to be movable in any direction thereabout within the housing to direct exiting air flow.

DISCLOSURE OF THE INVENTION

A general object of the invention is to provide an improved air outlet system.

Another object of the invention is to provide an air outlet system including a simple housing of a predetermined shape, having a hollow sphere with a portion thereof extending from the housing and being universally revolvable within the housing for aiming, shutting off, or diffusing air flow being blown therethrough.

Still another object of the invention is to provide such a spherical air outlet system wherein the hollow sphere has a plurality of openings of a first configuration formed in one portion thereof, and a plurality of openings of a second configuration formed in an oppositely disposed portion thereof.

A further object of the invention is to provide such a spherical air outlet system wherein the revolvable sphere may be simply selectively manually moved or spun so as direct oncoming air (1) in through the openings of the second configuration and in straight paths out through the oppositely disposed portion thereof, or (2) in through the openings of the first configuration and diffused in multiple directions out through the oppositely disposed portion thereof, or (3) to shutoff the air by presenting the solid portion intermediate the two pluralities of openings to the oncoming air flow.

A still further object of the invention is to provide such an air outlet system wherein a bearing arrangement is confined between the housing and the revolvable sphere therein.

BEST MODE OF CARRYING OUT THE INVENTION

Figure 1:
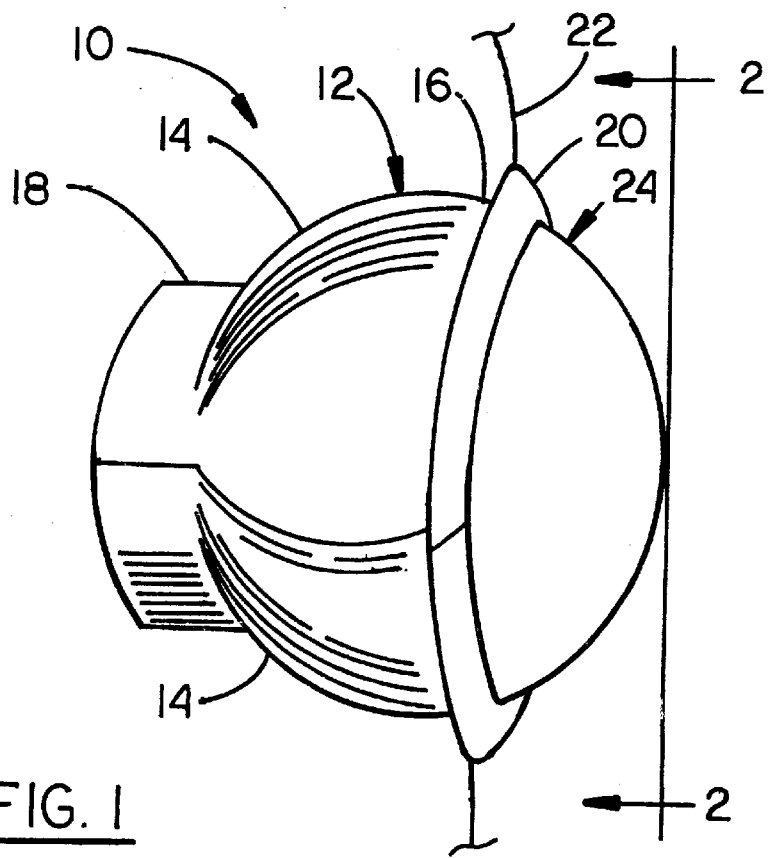
FIG. 1 is a perspective view of an air outlet system embodying the invention.

Referring now to the drawings in greater detail, FIG. 1 illustrates an air outlet system 10 including a housing 12 consisting of two halves 14 secured together in any suitable manner. Each half 14 includes a partial housing 16 having an integral air inlet half cylinder 18 at one end thereof, and an integral contoured housing outlet 20 at the other end formed as required to be mounted against either an inside or an outside surface, such as the surface of a vehicular instrument panel, represented as 22. A sphere 24 is revolvably mounted within the two housing portions 16 in a manner to be described. The sphere 24 may be hollow or include a passage therethrough formed by a suitable insert therein, represented as 25 in FIG. 9, of foam or other suitable material.

Figure 2:
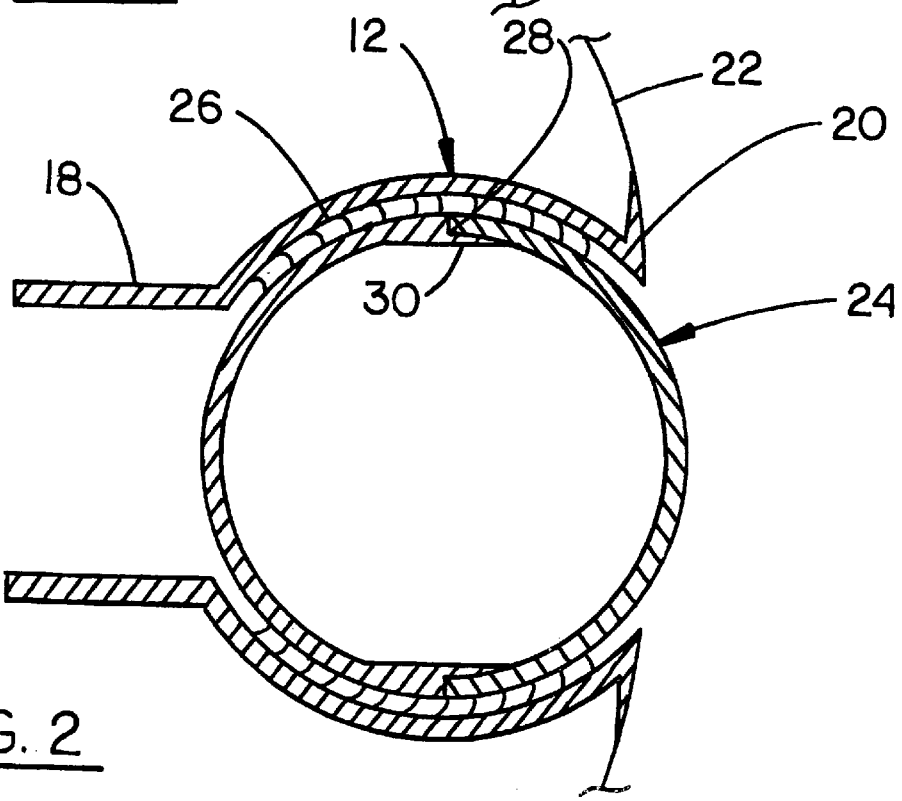
FIG. 2 is a cross sectional view taken through the center of FIG. 1, along the plane of the line 2—2 of FIG. 1.

FIG. 2 illustrates a felt liner 26 confined between the inner sphere 24 and the outer two housing portions 16, serving to frictionally retain the sphere in any manually selected position. Other suitable materials, or other suitable arrangements, may be used in lieu of the felt to serve as a bearing means between the sphere 24 and the housing 12. The sphere 24 comprises two interconnected semi spheres interfaced in a suitable manner all the way around, such as with an overlapped arcuate notch 28 formed in a thicker extended portion 30 on one half.

Figure 3:
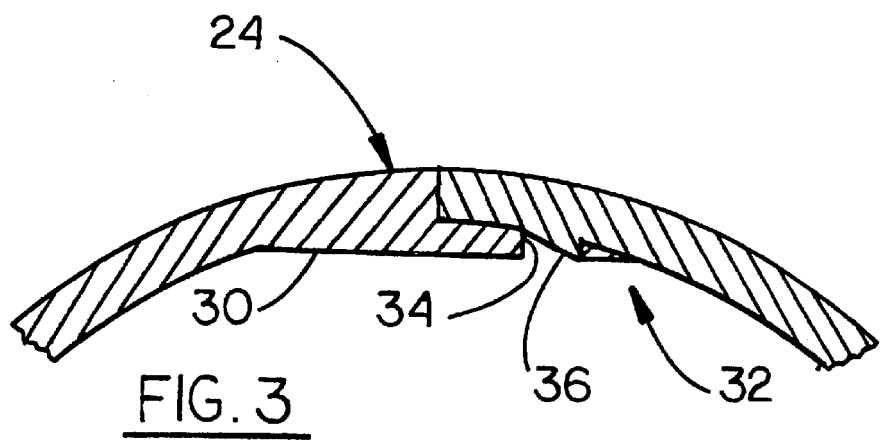
FIG. 3 is an enlarged partial cross sectional view showing an example of a locking feature for assembling the inner sphere of the invention.

FIG. 3 shows a locking feature 32 comprising an opening 34 formed in a predetermined number, say four, of circumferential locations around the thicker portion 30. A mating frustoconical lug 36 is formed on the other semi spherical half 24, adapted to snap into a respective opening 34. It is understood that other arrangements may be used to fasten the two halves together.

Figure 4:
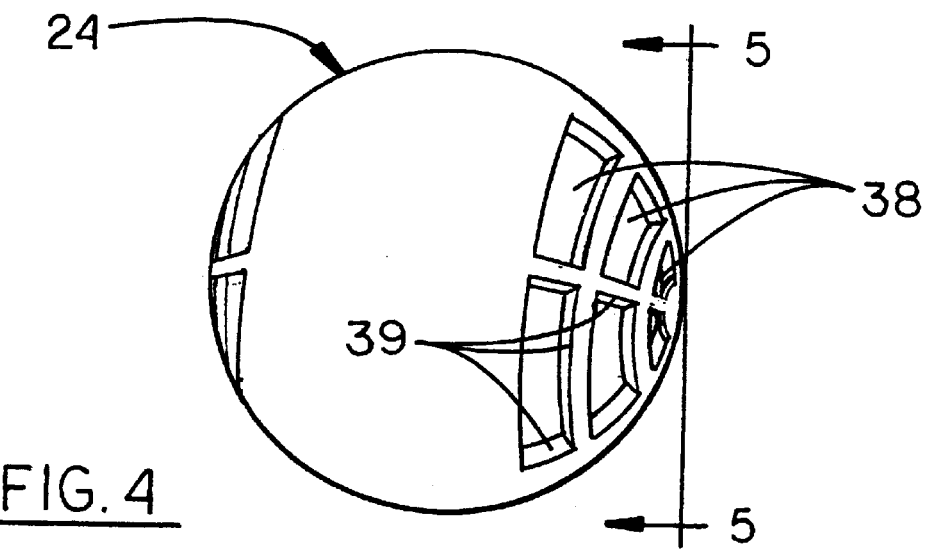
FIG. 4 is a side elevational view of the inner sphere of the invention.
Figure 5:
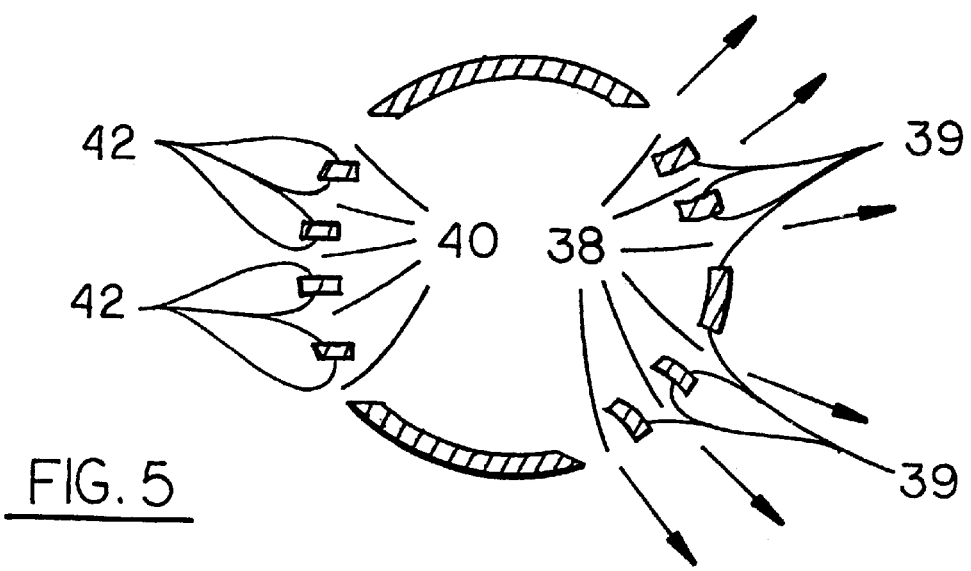
FIG. 5 is a cross sectional view taken through the center of FIG. 4, along the plane of the line 5—5 of FIG. 4.

Referring now to FIGS. 4 and 5, there is shown a plurality of contoured openings 38 formed through the wall in a portion of the hollow sphere 24, and a plurality of parallel openings 40 formed in an oppositely disposed portion of the hollow sphere. As noted in FIG. 5, the openings 38 are multi-directional due to the contoured shapes of the walls 39 forming the openings. The walls 39 are formed by integral segments which are a predetermined amount, say 5 to 7 mm, longer than the thickness of the wall of the sphere 24 proper. Hence, it may be realized that, with the sphere 24 of FIGS. 4 and 5 mounted in the air outlet assembly of FIGS. 1 and 2 with the openings 38 extending outwardly, air flow being blown in through the cylindrical inlet 18 of the housing 12 from a remote source (not shown), traverses through the openings 40 and thence out through the openings 38, serving to disperse the outlet air in a diffused manner, as represented by the arrows in FIG. 5. The precise peripheral shapes of the openings 38 and their sidewalls 39 may vary.

As also noted in FIG. 5, the openings 40 are formed by parallel walls 42. The walls 42 are formed by integral segments which are a predetermined amount longer than the thickness of the wall of the sphere 24 proper. When mounted in the assembly of FIGS. 1 and 2 and rotated so that the openings 40 extend outwardly therefrom, air being blown therethrough from the downstream remote source and thence through the openings 38 will exit in straight parallel paths.

As may be further realized from FIGS. 1, 2 and 4, 5, the portion of the sphere 24 intermediate the openings 38 and 40 may be manually rotated to substantially block the air flow in the cylindrical inlet 18.

Figure 6:
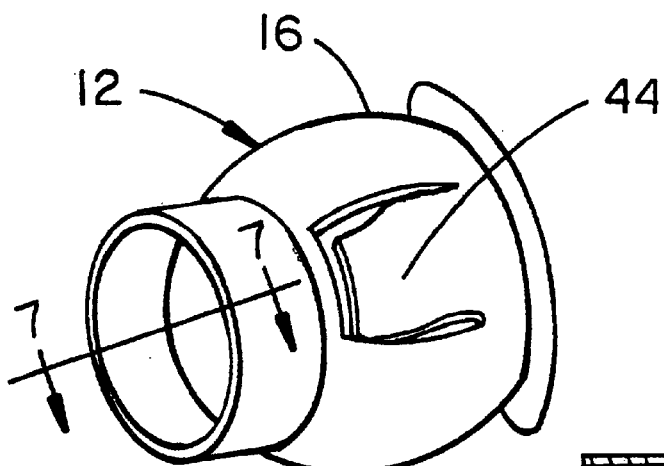
FIG. 6 is a schematic view of a first alternate arrangement of the invention.
Figure 7:
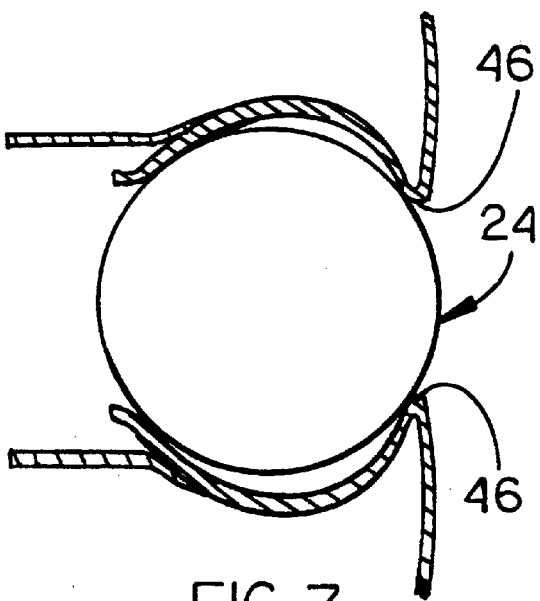
FIG. 7 is a cross sectional view of a housing with an inner sphere intact, taken along the plane of the line 7—7 of FIG. 6, and looking in the direction of the arrows.

Referring now to FIGS. 6 and 7, oppositely disposed cut-out sections 44 of the housing portions 16 are bent inwardly to serve as bearings for rotating the sphere therepast. The annular outlet end 46 of the housing 12 is shaped so as to also support the sphere 24 and to substantially blocked air flow therepast.

Figure 8:
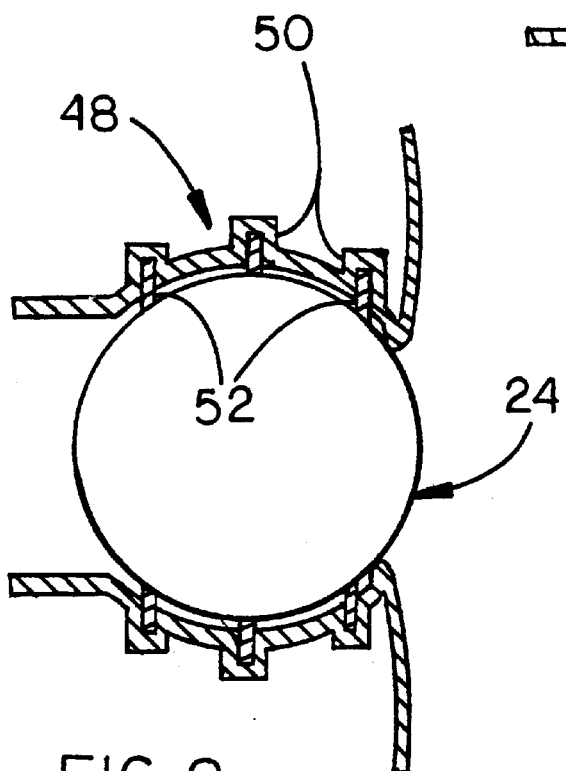
FIG. 8 is a cross sectional view, similar to FIG. 7, showing a further alternate arrangement of the invention.

Referring to FIG. 8, the housing 48 is formed to include a plurality, say three, of annular grooves 50 into which felt or suitable plastic rings 52 are mounted so as to contact the sphere 24, and thus serve as a further alternate bearing arrangement.

Figure 9:
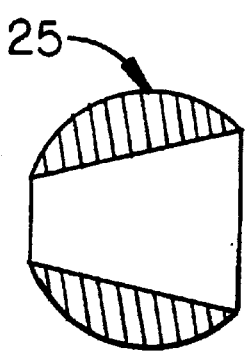
FIG. 9 is a cross sectional view of an insert which may be used in the spheres, and adapted to a line with oppositely disposed openings formed in the spheres.

Referring to FIG. 9, an insert 25 may be used in the sphere and adapted to a line with oppositely disposed openings formed in the sphere.

INDUSTRIAL APPLICABILITY

It should be apparent that the invention provides an efficient, compact, simply constructed, esthetically appealing, and easily actuated air outlet system.

It should be further apparent that no extra cost and no extra parts, the feature of air diffusion has been obtained.

It should be still further apparent that the invention provides both means for selectively dispersing straight and diffused air flow simply by effortlessly manually rotating a sphere extending through the housing outlet.

It should also be apparent that the invention provides an air outlet system which is ideal for use in automobiles.

It should also be apparent that various arrangements, other than a felt liner, such as a polypropylene or other plastic may be used intermediate the housing and the inner sphere.

It should be still further apparent that the openings 38 may be simple openings, such as holes, formed in the wall of the sphere, to direct air flow therethrough in a diffused manner. However, to better meet air flow requirements and to eliminate back pressure by the lands between openings, such lands and their sidewalls are preferably contoured and elongated inwardly into the hollow sphere a predetermined length.

While three embodiments of the invention have been shown and described, other modifications are possible within the scope of the following claims.

What is claimed is:

1. An air outlet system comprising a housing having an inlet end and an outlet end, spaced-apart annular grooves formed in the inner surface of said housing, a ring formed of one of felt or a plastic mounted in said annular grooves, a complete spherical element universally rotatably mounted against the inner peripheral edge of each said ring with a portion of said complete spherical element extending through said outlet end of said housing, said complete spherical element comprising two connected-together shells, a first plurality of openings formed in a wall portion of one of said shells such that the respective axes of the openings are parallel, a second plurality of openings formed in a wall portion of the other shell in contoured shapes such that the respective axes of the openings are multi-directional, wherein selectively manually rotating said complete spherical element in a first orientation permits air from a remote source through said inlet end of said housing to enter said first plurality of openings, traverse through said complete spherical element, and exit through said second plurality of openings in a diffused air flow, and selectively manually rotating said complete spherical element in a second position permits air from the remote source through said inlet end of said housing to enter said second plurality of openings, traverse through said complete spherical element, and exit through said first plurality of openings in a straight parallel flow.

2. The air outlet system described in claim 1, wherein the walls of said first plurality of openings are formed in predetermined lengths.

3. The air outlet system described in claim 1, wherein the walls of said second plurality of openings are parallel to each other and formed in predetermined lengths resulting in parallel air flow paths.

4. The air outlet system described in claim 1, wherein selectively rotating said complete spherical element to expose an intermediate portion substantially blocks off air entering said inlet end.

* * * * *